(12) United States Patent
Chan et al.

(10) Patent No.: US 12,487,577 B2
(45) Date of Patent: Dec. 2, 2025

(54) COMPENSATION METHOD FOR A MACHINING MEMBER

(71) Applicant: NATIONAL FORMOSA UNIVERSITY, Yun-Lin County (TW)

(72) Inventors: Tzu-Chi Chan, Yun-Lin County (TW); Chia-Chuan Chang, Yun-Lin County (TW); Han-Huei Lin, Yun-Lin County (TW); Yi-Hao Chen, Yun-Lin County (TW)

(73) Assignee: National Formosa University

( * ) Notice: Subject to any disclaimer, the term of this patent is extended or adjusted under 35 U.S.C. 154(b) by 508 days.

(21) Appl. No.: 18/061,054

(22) Filed: Dec. 2, 2022

(65) Prior Publication Data
US 2023/0418256 A1    Dec. 28, 2023

(30) Foreign Application Priority Data
Jun. 23, 2022    (TW) .................................. 111123510

(51) Int. Cl.
G05B 19/404    (2006.01)
G05B 19/18    (2006.01)
G05B 19/401    (2006.01)

(52) U.S. Cl.
CPC ......... G05B 19/404 (2013.01); G05B 19/182 (2013.01); G05B 19/401 (2013.01)

(58) Field of Classification Search
CPC ............................. G05B 19/182; G05B 19/401
USPC ........................................................ 700/159
See application file for complete search history.

(56) References Cited

U.S. PATENT DOCUMENTS

| 2010/0063618 A1* | 3/2010 | Chiu | G05B 19/404 |
| | | | 700/176 |
| 2017/0232575 A1* | 8/2017 | Bultez | B24B 13/005 |
| | | | 700/193 |
| 2020/0209830 A1* | 7/2020 | Chang | G05B 19/4063 |

FOREIGN PATENT DOCUMENTS

| CN | 105397566 A | | 3/2016 | |
| CN | 110691955 A | * | 1/2020 | ............. G01B 21/04 |
| CN | 111857069 A | * | 10/2020 | ....... G05B 19/41845 |
| JP | 2021057030 A | | 4/2021 | ............. G06N 3/084 |
| KR | 20090069413 A | * | 7/2009 | ........... B23Q 17/007 |
| KR | 101331584 B1 | * | 11/2013 | ............. B23Q 17/20 |
| WO | 2019176773 A1 | | 9/2019 | |

OTHER PUBLICATIONS

Search Report appended to an Office Action, which was issued to Taiwanese counterpart application No. 111123510 by the TIPO on Apr. 20, 2023 with an English translation thereof.

* cited by examiner

Primary Examiner — Ronald D Hartman, Jr.
(74) Attorney, Agent, or Firm — Rosenberg, Klein & Lee

(57) ABSTRACT

A measuring unit is used to measure a specific dimension of a product feature within a time segment to generate a measured dimension value. A processing unit compares the measured dimension value with a standard dimension value to generate an offset value. A control unit generates a control instruction based on the offset value, and transmits the control instruction to a machine on which machining member that is used to form the product feature is installed, so that the machine performs tool compensation on the machining member according to the control instruction.

6 Claims, 4 Drawing Sheets

COMPENSATION METHOD FOR A MACHINING MEMBER

CROSS-REFERENCE TO RELATED APPLICATION

This application claims priority to Taiwanese invention Patent Application No. 111123510, filed on Jun. 23, 2022.

FIELD

The disclosure relates to a compensation method, and more particularly to a compensation method for a machining member.

BACKGROUND

Nowadays, the development with machining is moving towards multi-axis, high-speed, high-precision, and intelligence. In order to meet the demands of high precision, regular measurements of finished products are necessary as the machining members (e.g., cutting tools) wear, so as to learn about the current machining condition and the wearing of the machining members, and then make compensation for the wearing of the machining members and perform statistical analysis on lifespan of the machining members.

Conventionally, measured data are recorded manually, which is inefficient and prone to human errors. Further, organizing the manually-recorded measured data that are collected with respect to multiple machines and performing an analysis thereon is time-consuming, which makes instant prediction of wear and the associated compensation and statistical analysis non-achievable.

SUMMARY

Therefore, an object of the disclosure is to provide a compensation method for a machining member. The compensation method can alleviate at least one of the drawbacks of the prior art, and achieve instant compensation and statistical analysis with respect to the machining member.

According to the disclosure, the machining member is installed on a machine, and the compensation method includes steps of: by a measuring unit, measuring a specific dimension of a product feature of a product within a time segment to generate a measured dimension value that corresponds to the time segment and the specific dimension of the product feature, wherein the product feature was formed using the machining member; by a processing unit that is connected to a storage unit, receiving the measured dimension value from the measuring unit, and comparing the measured dimension value with a standard dimension value that is pre-stored in the storage unit and that is related to the specific dimension of the product feature, so as to generate an offset value that corresponds to the time segment; and by a control unit that is communicatively coupled to the processing unit and the machine, generating a control instruction based on the offset value, and transmitting the control instruction to the machine, so that the machine performs tool compensation on the machining member according to the control instruction.

BRIEF DESCRIPTION OF THE DRAWINGS

Other features and advantages of the disclosure will become apparent in the following detailed description of the embodiment(s) with reference to the accompanying drawings. It is noted that various features may not be drawn to scale.

DETAILED DESCRIPTION

Figure 1:
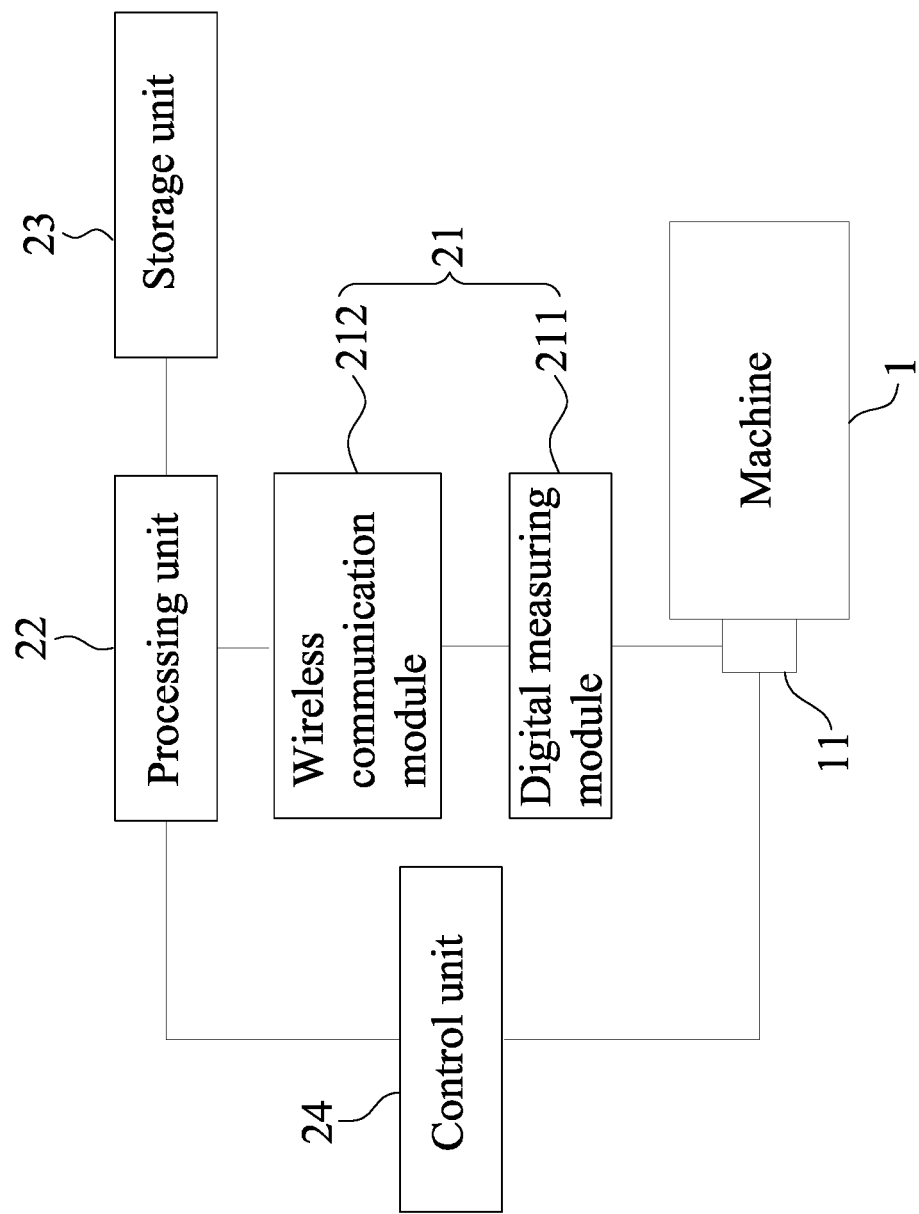
FIG. 1 is a block diagram illustrating an exemplary system that implements an embodiment of a compensation method for a machining member according to the disclosure.

Before the disclosure is described in greater detail, it should be noted that where considered appropriate, reference numerals or terminal portions of reference numerals have been repeated among the figures to indicate corresponding or analogous elements, which may optionally have similar characteristics.

Referring to FIG. 1, an embodiment of a compensation method is implemented by a compensation system that takes measurements on and performs tool compensation for a machining member 11 installed on a machine 1.

In this embodiment, the machine 1 is exemplified as a machine tool, such as a computer numerical control (CNC) machine, and the machining member 11 is exemplified as a cutter installed on the CNC machine, but in this disclosure, the machine 1 and the machining member 11 are not limited to any specific types.

The compensation system is connected to the machine 1 for controlling the machining member 11, and includes a measuring unit 21, a processing unit 22 (e.g., a processor) that is communicatively connected to the measuring unit 21, a storage unit 23 (e.g., a non-volatile storage medium such as flash memory, hard disk drives, solid state drives, etc.) that pre-stores a process database and that is connected to the processing unit 22, and a control unit 24 (e.g., a software program that is executed by the processing unit 22) that is communicatively connected to the machine 1 for controlling the machining member 11 through the machine 1. The process database includes standard specifications of a product to be made by the machine 1 by machining a workpiece, such as a standard dimension value that is related to a specific dimension of a feature of the product (referred to as "product feature" hereinafter), but this disclosure is not limited to such. In practice, the process database may further include, for example, an image of the product, and machining members to be used to machine the workpiece to make the product, etc.

The measuring unit 21 is used to measure a specific dimension (e.g., length) of the product feature within a time segment, so as to generate a measured dimension value that corresponds to the time segment and the specific dimension. In some embodiments, the measuring unit 21 may be used to measure more than one product feature, so as to generate multiple measured dimension values that cooperatively form a measured dataset corresponding to the time segment, but this disclosure is not limited in this respect.

In practice, the measuring unit 21 may include a digital measuring module 211, and a wireless communication module 212 that is communicatively connected to the digital measuring module 211. The digital measuring module 211 is configured to transmit the measured dimension value in a form of digital signals to the processing unit 22 through the wireless communication module 212, and the processing unit 22 stores the measured dimension value into the storage unit 23.

In this embodiment, the digital measuring module 211 may include, for example, a digital vernier scale, a digital indicator, a digital micrometer, other suitable digital measuring instruments, or any combination thereof, but this disclosure is not limited in this respect.

The processing unit 22 is configured to compare the measured dimension value with the standard dimension value that is pre-stored in the process database and that corresponds to the specific dimension of the product feature measured by the measuring module 211, so as to generate a deviation value that corresponds to the time segment and the specific dimension. The deviation value can be obtained by, for example, subtracting the standard dimension value from the measured dimension value. The deviation value may result from a difference between a standard dimension value and an actual dimension value of the machining member 11, and can be reduced by performing tool compensation on the machining member 11. The processing unit 22 generates an offset value based on the deviation value and provides the offset value to the control unit 24, and the control unit 24 generates a control instruction based on the offset value and transmits the control instruction to the machine 1, making the machine 1 perform tool compensation on the machining member 11 to compensate for the deviation value. The tool compensation comes in a variety of types (e.g., cutter length compensation, cutter radius compensation, etc.), and should be familiar to one skilled in the art, so details thereof are omitted herein for the sake of brevity.

In some embodiments, when the compensation system has performed dimensional measurements on the product feature in multiple time segments and thus acquired multiple offset values that respectively correspond to the multiple time segments, the processing unit 22 may use linear regression to obtain a trend curve with respect to compensation and time.

Figure 2:
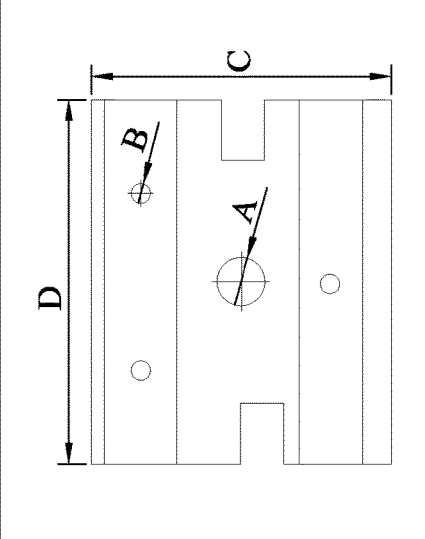
FIG. 2 is a schematic diagram illustrating a data creation page of a user interface that shows some information about a machining process of a product.

In practice, the processing unit 22, the storage unit 23 and the control unit 24 are integrated within a computer (not shown). Further referring to FIG. 2, before measuring the specific dimension of the product feature, the processing unit 22 activates the control unit 24 to present a user interface by presenting a data creation page in order for a user to input settings with respect to the product. In this illustrative embodiment, the product includes multiple features labelled "A," "B," "C" and "D," which are to be formed by machining the workpiece using the machining members labelled "1," "2," "3" and "4," respectively.

In this embodiment, each of the machining members is exemplified as a cutter, and the user may operate the data creation page to cause the processing unit 22 to retrieve data relating to the product that is pre-stored in the storage unit 23 and that indicates the product features, so as to import into the data creation page an image of the product with indications of positions of the product features with respect to the product, and determine settings with respect to each individual product feature. In one example, the settings may include a name of the product feature (see a field named "Feature" in FIG. 2), a serial number of the cutter to be used to form the product feature (see a field named "Cutter No." in FIG. 2), a direction of compensation with respect to the cutter (see a field named "Compensation Direction" in FIG. 2), a compensation ratio (see a field named "Compensation Ratio" in FIG. 2), a standard dimension value for the product feature (see a field named "Standard Value" in FIG. 2), a dimension upper limit for the product feature (see a field named "Upper Limit" in FIG. 2), and a dimension lower limit for the product feature (see a field named "Lower Limit" in FIG. 2).

In more detail, after inputting a product number and a program number that are related to the product, the processing unit 22 loads information of the product and relevant machining members into the data creation page. In the illustrative embodiment, the data creation page displays the image of the product in the upper-right portion, and displays the settings related to product features (e.g., those labelled "A," "B," "C," "D" in FIG. 2) of the product in the lower portion.

In the illustrative embodiment, the data creation page includes multiple setting fields with respect to the specific dimensions (e.g., a cutter length, a cutter radius, etc.) of the product features "A," "B" "C," "D," Particularly, the "Compensation Ratio" field represents a ratio to be applied to the compensation with respect to the corresponding deviation value. For example, the compensation ratio may be set as "0.5" when the corresponding product feature is formed by single-side machining, and as "1" when the corresponding product feature is formed by circular machining. The compensation ratio may have a plus sign or a minus sign, which is used to represent internal-radius processing or external-radius processing. In addition, the values in the setting fields of "Standard Value," "Upper Limit" and "Lower Limit" are established based on relevant dimensions of the product features and predetermined tolerances that are defined in a technical drawing for machining.

Figure 3:
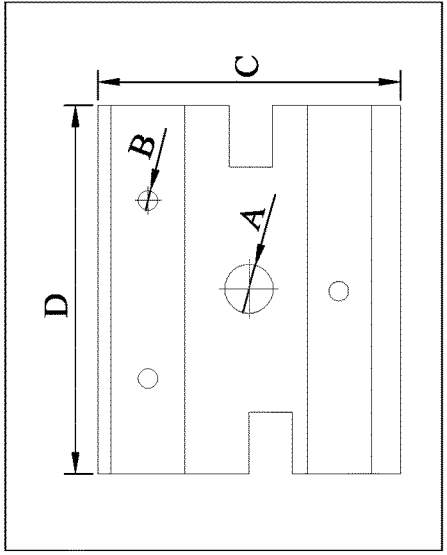
FIG. 3 is a schematic diagram illustrating a measurement page of the user interface that shows a measured dataset about some product features.

After the data creation for the product is completed, a measurement page may be displayed as exemplified in FIG 3. The measurement page may provide some tips to guide a user to perform measurement on the product features "A" "B," "C" "D," and the measured dimension values of the product features "A," "B," "C" "D" will be shown in a "Measured Value" field.

Further referring to FIG. 1, at first, the compensation system may show prompts relating to positions of the product features "A," "B," "C," "D," and then the digital vernier scale, the digital indicator and/or the digital micrometer of the digital measuring module 211 are controlled to measure the specific dimensions of the product features "A," "B," "C," "D," so as to acquire a measured dataset that includes multiple measured dimension values with respect to the specific dimensions of the product features "A," "B," "C," "D." Then, the measuring module 211 transmits the measured dataset to the processing unit 22 through the wireless communication module 212, and then the processing unit 22 stores the measured dataset into the storage unit 23. The processing unit 22 will make the measurement page display the measured dataset in the "Measured Value" field (note that the measurement page depicted in FIG. 3 shows a state where the measured dataset has not been displayed in the "Measured Value" field), and automatically calculate the deviation value with respect to each of the measured dimension values of the measured dataset. In this embodiment, the deviation value is calculated by subtracting the standard dimension value from the measured dimension value, but this disclosure is not limited in this respect.

For each of the product features "A," "B," "C," "D," the processing unit 22 calculates an offset value based on the corresponding deviation value (e.g., by multiplying the deviation value with the corresponding compensation ratio) tool to compensate for tool deviation of the corresponding machining member "1," "2" "3," "4." in this embodiment, when the user selects a row corresponding to one particular product feature and presses a "Compensate" button in the measurement page, the processing unit 22 submits the corresponding offset value to the control unit 24 to generate a control instruction based on the offset value. The control instruction is then provided to the machine 1 so that the machine 1 can perform the tool compensation with respect to the corresponding one of the machining members "1," "2," "3," "4" accordingly. For example, when the "Compensation Direction" field says "cutter length," which means that formation of the corresponding product feature is related to a lengthwise direction of the corresponding cutter, the machine 1 would perform tool compensation in the lengthwise direction of the corresponding cutter based on the corresponding offset value.

in some embodiments, compensation with respect to a machining member 11 may involve one or more compensation directions, and each of the compensation direction(s) corresponds to a predetermined offset threshold, which is an indication that the machining member 11 has worn out and can no longer be used. When such machining member 11 is in use, upon determining that the offset value that corresponds to one of the compensation direction(s) is greater than the corresponding predetermined offset threshold, the processing unit 22 may generate a notification message indicating that the machining member 11 has to be replaced, so as to notify the user to replace the machining part 11. Then, the user may select the machining member 11 on the measurement page, and press a "Replace" button to activate an automation process to replace the machining part 11 and to determine a total number of workpieces the machining member 11 has processed, and the offset value that corresponds to the machining member 11 will be cleared. The total number of products the machining member 11 has processed can be used in subsequent statistical analysis.

In mass production, the machining member 11 would gradually wear out from continued use. The measured dimension values of the product feature can be used to derive a wear amount of the machining member 11. The wear amount and time of usage of the machining member 11 may be helpful to the user in terms of analyzing the machining process and the lifespan of the machining member 11.

Figure 4:
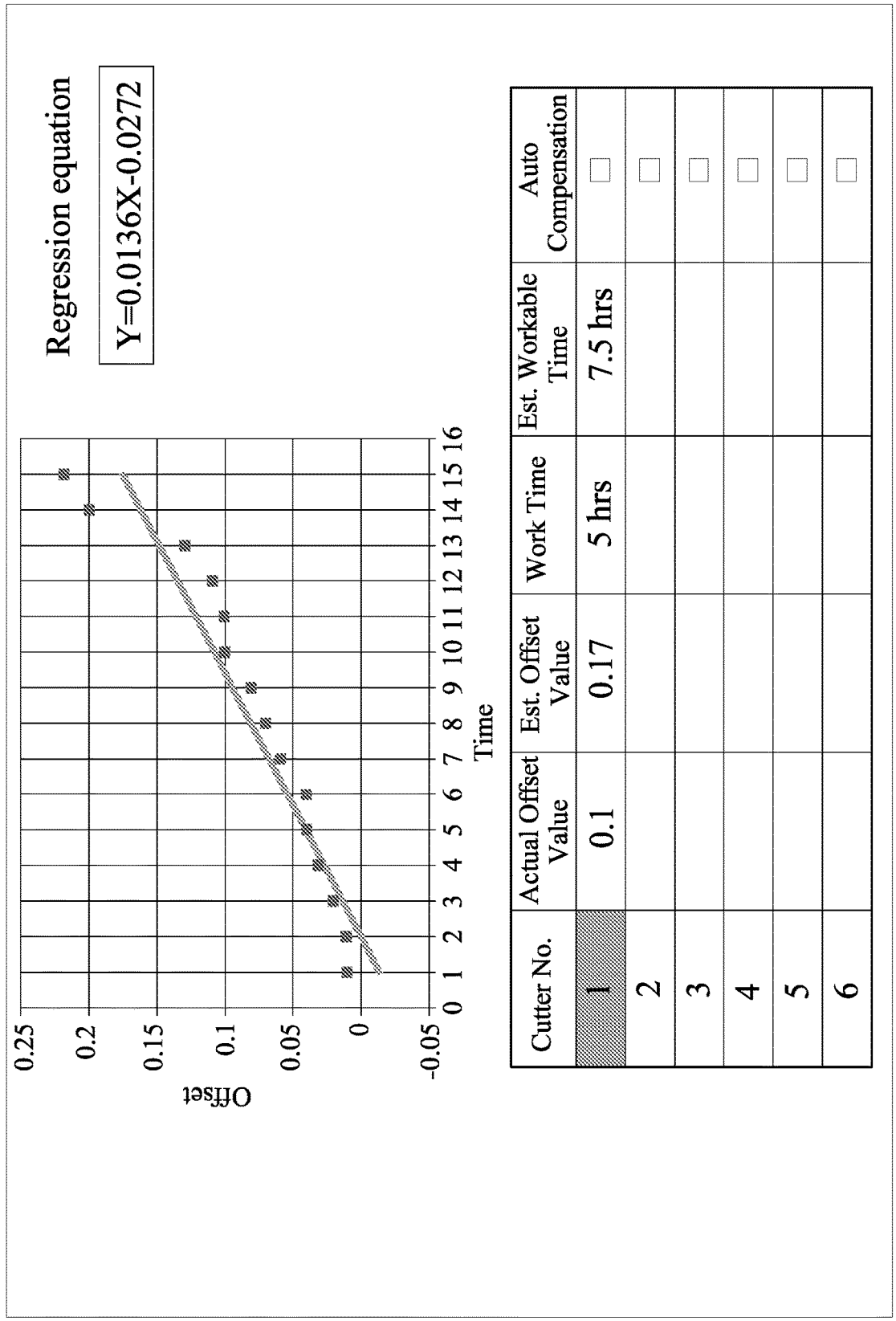
FIG. 4 is a schematic diagram illustrating a statistics page of the user interface that shows statistics regarding compensations performed on a machining member.

As an example, when the machining member 11 keeps on being used to process the same product feature within a period of time that has multiple time segments, and the specific dimension of the product feature was measured and tool compensation was performed on the machining member 11 in each time segment, the difference between the measured dimension value and the standard dimension value (i.e., the deviation value) will change over time because of the wearing of the machining member 11 (i.e., having multiple different deviation values that respectively correspond to the time segments), and the change in the deviation value and the resultant offset value correspond to the wear amount of the machining member 11. FIG. 4 exemplifies a statistics page that shows a statistical graph of fifteen data points of an offset value with respect to a compensation direction of a cutter labelled "1" for fifteen time segments. In this embodiment, linear regression is used to obtain a trend line $Y=0.0136X-0.0272$ based on the offset values that respectively correspond to the time segments. The abovementioned measurements and statistical analysis can be made available for real-time online inspection and remote monitoring, which enables the working condition of the machining member 11 and the machine 1 to be known in real time, and so the manpower required to perform the measurement and data analysis can be reduced, thereby approaching unmanned and intelligent manufacturing.

To sum up, the embodiment of the compensation method for a machining member according to this disclosure uses digital measurement to obtain a measured dataset with respect to a product feature, and the measured dataset is wirelessly transmitted to the storage unit 23 for the processing unit 22 to acquire a corresponding offset value based thereon, so as to make the control unit 24 generate a control instruction that causes the machine 1 to perform tool compensation on the machining member 11 based on the offset value and to perform statistical analysis on the wear amount with respect to the machining member 11, thereby achieving efficient time and cost control. Further, by virtue of remotely controlling the measuring unit 21 to perform dimensional measurement on the product feature and collecting the measured datasets that correspond to multiple time segments for analysis, online real-time diagnostic and monitoring can be achieved, so the working conditions of the machine 1 and the machining member 11 can be monitored in real time, thus approaching unmanned and intelligent manufacturing.

In the description above, for the purposes of explanation, numerous specific details have been set forth in order to provide a thorough understanding of the embodiment(s). It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects; such does not mean that every one of these features needs to be practiced with the presence of all the other features, in other words, in any described embodiment, when implementation of one or more features or specific details does not affect implementation of another one or more features or specific details, said one or more features may be singled out and practiced alone without said another one or more features or specific details. It should be further noted that one or more features or specific details from one embodiment may be practiced together with one or more features or specific details from another embodiment, where appropriate, in the practice of the disclosure.

While the disclosure has been described in connection with what is(are) considered the exemplary embodiment(s), it is understood that this disclosure is not limited to the disclosed embodiment(s) but is intended to cover various arrangements included within the spirit and scope of the broadest interpretation so as to encompass all such modifications and equivalent arrangements.

What is claimed is:

1. A compensation method for a machining member that is installed on a machine, comprising:
   by a measuring unit, measuring a specific dimension of a product feature of a product within a time segment to generate a measured dimension value that corresponds to the time segment and the specific dimension of the product feature, wherein the product feature was formed using the machining member;
   by a processing unit that is connected to a storage unit, receiving the measured dimension value from the measuring unit, and comparing the measured dimension value with a standard dimension value that is pre-stored in the storage unit and that is related to the specific dimension of the product feature, so as to generate an offset value that corresponds to the time segment; and by a control unit that is communicatively coupled to the processing unit and the machine, generating a control instruction based on the offset value, and transmitting the control instruction to the machine, so that the machine performs tool compensation on the machining member according to the control instruction, said compensation method further comprising, before the step of measuring the specific dimension of the product feature, a step of, by the processing unit, retrieving product data that indicates a position of the product feature with respect to the product, and the machining member that is to be used to form the product feature.

2. The compensation method as claimed in claim 1, further comprising a step of, by the processing unit, outputting a notification message indicating that the machining member has to be replaced upon determining that the offset value is greater than a predetermined offset threshold.

3. The compensation method as claimed in claim 1, further comprising, after the step of measuring the specific dimension of the product feature, a step of, by a digital measuring module of the measuring unit, transmitting the measured dimension value in a form of digital signals to the processing unit through a wireless communication module of the measuring unit for the processing unit to store the measured dimension value into the storage unit.

4. The compensation method as claimed in claim 3, wherein the digital measuring module includes at least one of a digital vernier scale, a digital indicator or a digital micrometer.

5. The compensation method as claimed in claim 1, wherein the machine is a machine tool, and the machining member is a cutter.

6. The compensation method as claimed in claim 1, further comprising steps of:

for each of different time segments, repeating the steps of measuring the specific dimension of the product feature by the measuring unit, receiving the measured dimension value from the measuring unit by the processing unit, comparing the measured dimension value with the standard dimension value by the processing unit, generating the control instruction by the control unit, and transmitting the control instruction to the machine by the control unit, so as to obtain a plurality of the offset values that respectively correspond to the time segments; and using linear regression to generate a trend line with respect to tool compensation based on the offset values and the respective time segments.

* * * * *